United States Patent
Kann

(10) Patent No.: US 12,227,700 B2
(45) Date of Patent: *Feb. 18, 2025

(54) FINE MINERAL MATTER FOR UPGRADING THE QUALITY OF THE PRODUCTS OF THERMAL OR CATALYTIC CRACKING OR IN-SITU HEAVY OIL CATALYTIC CRACKING

(71) Applicant: Radical Plastics, Inc., Marblehead, MA (US)

(72) Inventor: Yelena Kann, Marblehead, MA (US)

(73) Assignee: Radical Plastics, Inc., Marblehead, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,060

(22) Filed: Mar. 8, 2024

(65) Prior Publication Data
US 2024/0279555 A1    Aug. 22, 2024

Related U.S. Application Data

(63) Continuation of application No. 17/528,789, filed on Nov. 17, 2021, now Pat. No. 11,926,798.
(Continued)

(51) Int. Cl.
*C10G 1/00* (2006.01)
*C09K 8/592* (2006.01)
(Continued)

(52) U.S. Cl.
CPC ............... *C10G 3/40* (2013.01); *C09K 8/592* (2013.01); *C09K 8/594* (2013.01); *C10B 53/07* (2013.01);
(Continued)

(58) Field of Classification Search
CPC ... C10G 3/40; C10G 3/42; C10G 3/57; C10G 2300/4006; C10G 2300/4012;
(Continued)

(56) References Cited

U.S. PATENT DOCUMENTS

2011/0089081 A1   4/2011  Srinakruang
2016/0040074 A1*  2/2016  Methling .................. C08J 11/12
                                                                 585/16
2019/0291302 A1*  9/2019  Kann .................... C08K 11/005

FOREIGN PATENT DOCUMENTS

CN        109158100 A      1/2019

OTHER PUBLICATIONS

Extended European Search Report for application No. PCT/US2021059682, mailed Mar. 12, 2024, (11 pages).
(Continued)

*Primary Examiner* — In Suk C Bullock
*Assistant Examiner* — Jason Y Chong
(74) *Attorney, Agent, or Firm* — Nutter McClennen & Fish LLP

(57) ABSTRACT

The present disclosure generally relates to the utilization of a fine mineral matter in the process of upgrading the liquid products obtained by thermolysis or pyrolysis of solid plastic waste or biomass or from cracking, coking or visbreaking of petroleum feedstocks. More particularly, the present disclosure is directed to a process of stabilization of the free-radical intermediates formed during thermal or catalytic cracking of hydrocarbon feedstocks including plastic waste and on a process of catalytic in-situ heavy oil upgrading. The fine mineral matter may be derived from natural sources or from synthetic sources.

20 Claims, 8 Drawing Sheets

Related U.S. Application Data

(60) Provisional application No. 63/115,550, filed on Nov. 18, 2020.

(51) Int. Cl.
*C09K 8/594* (2006.01)
*C10B 53/07* (2006.01)
*C10B 57/06* (2006.01)
*C10G 3/00* (2006.01)
*E21B 43/243* (2006.01)

(52) U.S. Cl.
CPC ............... *C10B 57/06* (2013.01); *C10G 3/42* (2013.01); *C10G 3/57* (2013.01); *E21B 43/243* (2013.01); *C10G 2300/4006* (2013.01); *C10G 2300/4012* (2013.01); *C10G 2300/80* (2013.01)

(58) Field of Classification Search
CPC ...... C10G 2300/80; C10G 1/002; C10G 1/10; C10G 29/04; C09K 8/592; C09K 8/594; C10B 53/06; C10B 53/07; C10B 57/06; C10B 47/24; E21B 43/243; Y02P 30/20; C10K 1/20
See application file for complete search history.

(56) References Cited

OTHER PUBLICATIONS

Sanahuja-Parejo, O., et al., "Catalytic co-pyrolysis of grape seeds and waste tyres for the production of drop-in biofuels", Energy Conversion and Management 171(2018) 1202-1212 (11 pages).

\* cited by examiner

610

FINE MINERAL MATTER FOR UPGRADING THE QUALITY OF THE PRODUCTS OF THERMAL OR CATALYTIC CRACKING OR IN-SITU HEAVY OIL CATALYTIC CRACKING

CROSS-REFERENCE TO RELATED APPLICATION

This application is a continuation of U.S. patent application Ser. No. 17/528,789, filed Nov. 17, 2021, which claims the benefit of U.S. Provisional Application No. 63/115,550, filed Nov. 18, 2020, the entire contents of each of which are incorporated herein by reference in their entirety.

FIELD OF THE INVENTION

The present disclosure generally relates to the utilization of fine mineral matter in the process of upgrading the liquid products obtained by thermolysis or pyrolysis of solid plastic waste or biomass or from cracking, coking or visbreaking of petroleum feedstocks. More particularly, the present disclosure is directed to a process of stabilization of the free-radical intermediates formed during thermal or catalytic cracking of hydrocarbon feedstocks including plastic waste and on a process of catalytic in-situ heavy oil upgrading. The fine mineral matter may be derived from coal.

BACKGROUND OF THE INVENTION

The synthetic plastics industry has been one of the great industrial successes of the last 50 years. Plastics production has surged from 15 million metric tons in 1964 to 311 million tons in 2014, and is expected to double again over the next 20 years, as plastics come to serve increasingly many applications The downside of plastics success is a very rapid increase of plastic wastes and litter. It is estimated that the worldwide amount of plastics ending in landfill is almost half of the produced amount, being approximately 150 million tons annually. Waste disposal becomes problematic due to the costs and availability of landfilling, toxicity of incineration and limited amount of the cycles that mechanical recycling can support.

SUMMARY OF VARIOUS EMBODIMENTS

In accordance an embodiment of the invention, a method of producing liquid and gas products from an organic feedstock includes: obtaining an amount of a fine mineral matter, the fine mineral matter comprising at least one metal selected from the group consisting of Fe, Cu, Mn, Al, Zn, or combinations thereof at the following concentrations: Fe 14,000 to 45,000 ppm; Cu 10 to 30 ppm; Mn 100 to 1,500 ppm; Al 3,000 to 25,000; and Zn 20 to 30 ppm; loading the amount of fine mineral matter into a thermal reactor, the fine mineral matter forming a portion of a reactor bed material; providing an organic feedstock to the thermal reactor containing the fine mineral matter; heating the thermal reactor to a temperature; flowing a fluidizing gas through the thermal reactor, the thermal reactor being held at the temperature and/or a pressure; and collecting the produced liquid and gas products from the thermal reactor. The fine mineral matter may have a range of particle sizes between about 2,000 microns and 1 micron.

The produced liquid products may include stabilized hydrocarbons. The stabilized hydrocarbons may include a gasoline (C4-C12), a kerosene (C10-C18), a diesel (C12-C23), a motor oil (C23-C40), or a combination thereof.

The fine mineral matter may be derived from natural resources. The fine mineral matter may be derived from at least one of coal, volcanic basalt, glacial rock dust deposits, iron potassium silicate, or sea shore deposits.

The fine mineral matter may be derived from a synthetic source. The fine mineral matter may be impregnated with iron to form (Fe)/fine mineral matter matrix, manganese to form (Mn)/fine mineral matter matrix, and/or copper to form (Cu)/fine mineral matter matrix.

The fine mineral matter may include at least one of Ca, K, Na, Mg, or combinations thereof at the following concentrations: Ca 1,000 to 2,600 ppm; K 600 to 104,000 ppm; Na 300 to 11,000 ppm; and Mg 20 to 8,000 ppm.

The portion of reactor bed material may be a first portion. The method may further include loading an amount of an additional reactor bed material into the thermal reactor. The additional reactor bed material may form a second portion of the reactor bed material. The second portion of the reactor bed material may include at least one of silica sand, calcite, olivine, or other material. The concentration of the fine mineral matter in the reactor bed material is between 0.5 and 50%. The thermal reactor may be a fixed reactor, a fluidized bed reactor, a screw reactor, or stirred tank reactor.

The collecting the produced liquid and gas products may include separating the produced liquid and gas products from the solid products and the reactor bed material. The separating may include at least one of a gravimetric separation or a distillation separation.

The concentrations of the metals in the fine mineral matter may be measured in ppm with ICP (inductively coupled plasma). The ICP may be coupled with atomic emission spectroscopy (AES) and/or mass spectrometer analysis (MS). The ICP analysis may utilize nitric acid, hydrochloric acid, and hydrogen peroxide in a heated digester.

The fine mineral matter may prevent or minimize at least one of free radical polymerization, cross-linking, or recombination of hydrocarbon chains, thus reducing formation of high viscosity tar liquids, char, and other low value products.

The organic feedstock may include at least one of a plastic solid waste, mixed plastic solid waste, biomass, organic solid waste, heavy oil feedstock, or in-situ heavy oil. The organic feedstock may include liquid products obtained from cracking, coking, or visbreaking of petroleum feedstocks.

In accordance with another embodiment of the invention, a method of in-situ catalytic upgrading of heavy oil or non-traditional hydrocarbon compounds directly in the oil fields includes: contacting components of oil in a production well with a fine mineral matter with particle sizes ranging from between about 2,000 microns to about 1 micron; injecting air into the components of oil in the production well and the fine mineral matter; heating the components of oil in the production well and the fine mineral matter; and collecting the upgraded heavy oil or non-traditional hydrocarbon compounds.

The fine mineral matter may be derived from coal and/or mined from natural resources including volcanic basalt, glacial rock dust deposits, iron potassium silicate and/or sea shore deposits. The fine mineral matter may include at least one metal selected from the group consisting of Fe, Cu, Mn, Zn, Al, or combinations thereof at the following concentrations: Fe 14,000 to 45,000 ppm; Cu 10 to 300 ppm; Mn 100 to 1,500 ppm; Al 3,000 to 25,000 ppm; and Zn 20 to 300 ppm. The fine mineral matter may include Ca, K, Na, Mg or combinations thereof at the following concentrations: Ca 1,000 to 2,600 ppm; K 600 to 10,000 ppm; Na 300 to 11,000 ppm; and Mg 20 to 10,000 ppm. The concentration of the fine mineral matter in the components of oil may be between 0.5 and 50%.

The fine mineral matter may be derived from a synthetic source. The fine mineral matter may be impregnated with iron to form (Fe)/fine mineral matter matrix, manganese to form (Mn)/fine mineral matter matrix, and/or copper to form (Cu)/fine mineral matter matrix.

The utilization of the fine mineral matter for in-situ catalytic upgrading of heavy oil or non-traditional hydrocarbon compounds may be performed with lower energy requirements than is possible without the fine mineral matter.

In embodiments, the method may allow for reduced temperature of the process and lower energy requirements, and enable utilization of the aforementioned fine mineral matter and its ability to upgrade the quenched or condensed liquids.

In accordance with another embodiment of the invention, a method of upgrading liquid products obtained by thermolysis or pyrolysis of solid plastic waste includes: contacting a quenched liquid, condensed gases, or pyrolysis vapors with a fine mineral matter derived from coal and/or mined from natural resources including volcanic basalt, glacial rock dust deposits, iron potassium silicate and/or sea shore deposits with particle sizes ranging from less than about 2,000 microns to about 1 micron; and separating the quenched liquid or condensed gases from the fine mineral matter. The fine mineral matter may include particles having a range of surface areas between about 5 m2/g and 35 m2/g.

The fine mineral matter may prevent or minimize free radical polymerization, cross-linking, or recombination of hydrocarbon chains preventing formation of high viscosity tar liquids, char and other low value products.

In accordance with another embodiment of the invention, a method of upgrading liquid products obtained by thermolysis or pyrolysis of solid plastic waste includes: contacting a quenched liquid, condensed gases, or pyrolysis vapors with a supported catalyst, the supported catalyst comprises an iron (Fe)/fine mineral matter matrix, a manganese (Mn)/fine mineral matter matrix, a copper (Cu)/fine mineral matter matrix, or a combination thereof, the supported catalyst is applied in concentrations between 0.5 and 10%; and separating the quenched liquid or condensed gases from the fine mineral matter. The supported catalyst may be based on non-naturally occurring sources. The supported catalyst may be based on naturally occurring sources.

DESCRIPTION OF ILLUSTRATIVE EMBODIMENTS

Figure 1:
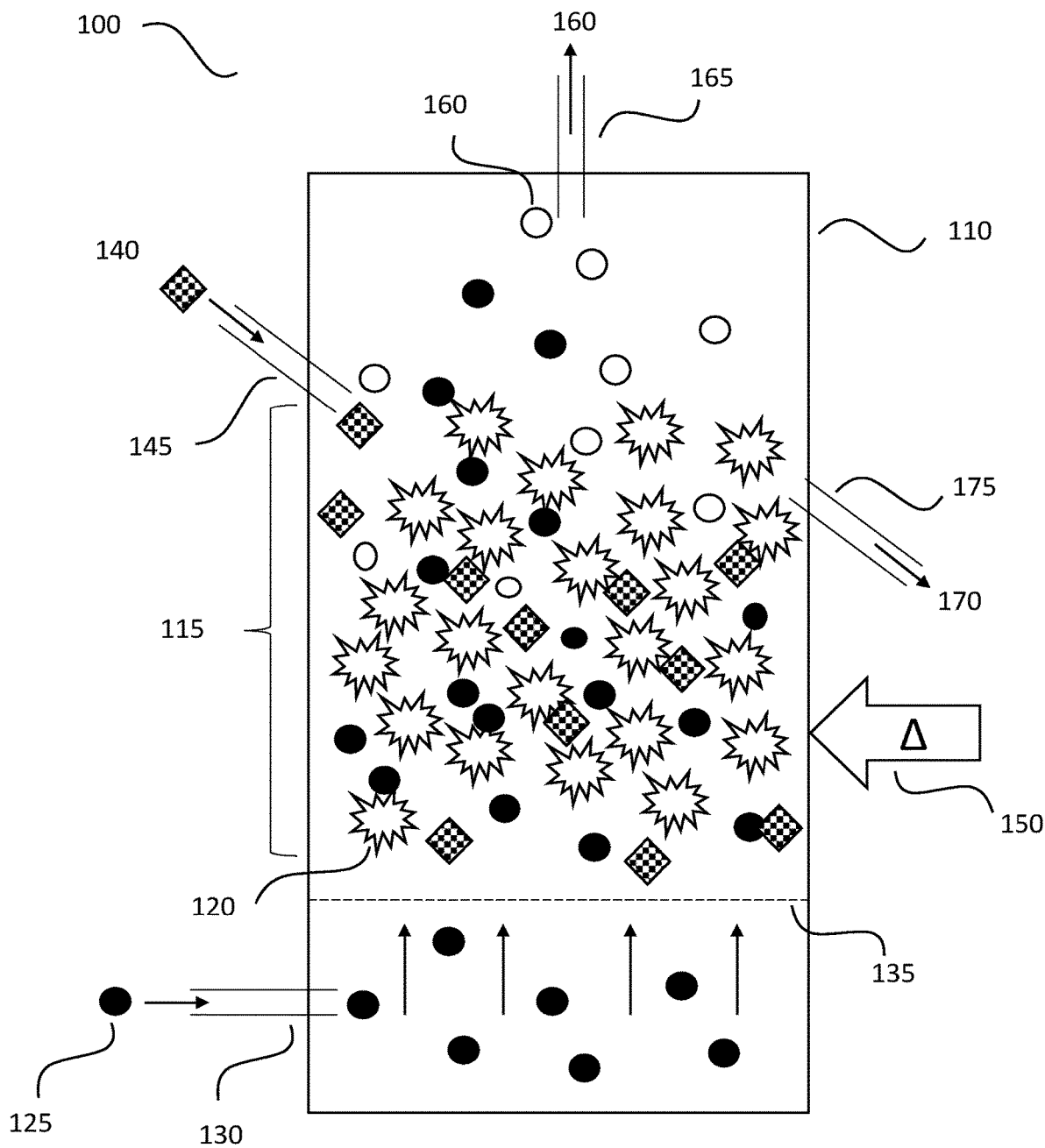
FIG. 1 shows a schematic diagram of a thermal reactor for the conversion of an organic feedstock into stabilized hydrocarbons, FIG. 2 schematically illustrates stabilizing unstable quenched liquids, condensed gasses, and/or pyrolysis vapors.

In illustrative embodiments, utilization of natural, abundant, low cost, non-toxic fine mineral matter in direct stabilization of the intermediary thermal cracking products of high value is described. The thermal cracking may refer to either thermolysis or pyrolysis and conducted either in the presence or absence of a catalyst.

Thermochemical Recycling of Plastics

Progression towards using plastic materials in a circular way (e.g., chemical recycling) requires a technology that treats any type of plastic waste (PW), sorted or unsorted, and produces plastics of the same quality as the original. This would close the material cycle, transitioning the waste plastic into the feedstock for new plastics, rather than combusting it for energy recovery or landfilling. This can be achieved by thermochemical recycling, which entails theoretically unlimited recycling of any plastic material (mixed or sorted), where the focus is on recovering the building blocks of the plastic materials.

Chemical recycling assumes either conversion of polymers into smaller molecules further produced into the same product they were recovered from originally (closed loop recycling), or into different products (open loop recycling). It would reduce plastics pollution in the environment, transfer the value of original materials to the next generation products, reduce the consumption of fossil feedstock (stored carbon), and reduce the environmental costs associated with fossil feedstock greenhouse gas (e.g., GHG) emissions.

Chemical recycling has a great potential for heterogeneous and contaminated plastic waste material if separation is neither economical nor technically feasible.

For some plastics, such as poly(ethylene terephthalate) (PET), polyurethanes (PUR) and polyamides (PA), chemical recycling options exist. Additional polymers, like polyethylene (PE), in contrast to condensation polymers (like PET), cannot be easily recycled by simple chemical methods. Instead, thermochemical recycling techniques like pyrolysis have been described as a process for producing a series of refined petrochemical products and particularly of a liquid fraction similar with that of commercial gasoline.

The pyrolysis process takes place at moderate to high temperatures (500° C., 1-2 atm) in the absence of oxygen. The high temperatures allow for breaking down the macromolecules of the polymer to form smaller molecules. Depending on the nature of the polymer, either depolymerization or random fragmentation will dominate. The pyrolysis product of solid plastic waste (SPW) can be divided into a non-condensable gas fraction, a liquid fraction (consisting of paraffins, olefins, naphthenes, and aromatics), and solid waste. From the liquid fraction can be recovered hydrocarbons in the gasoline range (C4-C12), diesel range (C12-C23), kerosene range (C10-C18), and motor oil range (C23-C40).

The thermal pyrolysis often results in products with low quality, making this process commercially unfeasible. This occurs because the uncatalyzed thermal degradation gives rise to low molecular weight substances, however in a very wide range of products. This method can be improved by the addition of catalysts, which will allow for the reduction of the temperature and reaction time, and allow the production of hydrocarbons with a higher added value, such as fuel oils and petrochemical feedstocks. That is, the use of catalysts gives an added value to the pyrolysis and cracking. Efficiency of these catalysts depends on their chemical and physical characteristics to promote the breaking of C—C bonds and determine the length of the chains of the obtained products.

A key difficulty of the pyrolysis process is the complexity of reactions that occur, especially when mixed streams are processed. Different polymers produce different product spectra according to their dominant decomposition pathway: PE and polypropylene (PP) have the tendency to randomly fragmentize while polytetrafluoroethylene (PTFE), PA, polystyrene (PS) and polymethylmethacrylate (PMMA) can be pyrolyzed mostly into their respective monomers. On the other hand, the product spectrum of PE and PP is very broad and further processing, such as distillation or separation is typically needed resulting in petrochemical feedstock such as naphtha or diesel.

Thermal cracking of polyolefins and/or plastics making up to 60-70% of all plastics found in municipal solid waste, proceeds through a radical random scission mechanism in 4 steps: initiation, propagation, inter- or intra-molecular hydrogen abstraction, followed by beta-scission and termination. With the catalyst, the pyrolysis temperature can be typically reduced to 300-350° C., and the products have a more narrow distribution of the number of carbon atoms being directed to more specific products. For example, pyrolysis of a plastic bag made from low density PE (LDPE) leads to a fraction mainly in the region of $C_4$-$C_{12}$, which is in the gasoline region.

Catalysts

Generally, the catalysts used in the catalytic thermolysis or pyrolysis are solid acids such as zeolites. The type of degradation they induce involves production of the intermediate carbenium ion by hydrogen transfer reactions. Zeolites favor these reactions due to the acidity of their active sites, which help in the process of breaking the polymer macromolecules. This breaking process begins on the surface of the zeolite, because the polymer needs to be broken into smaller molecules before entering the internal pores of these solids, due to the small size of their pores. Zeolites have a specific molecular pore size and access of such molecules to catalytic reactive sites, as well as growth of the final products within such pores is limited by its size.

In addition to zeolites (ZSM-5, Y, Beta), other types of heterogeneous catalysts are conventional solid acids such as silica-alumina, alumina and FCC catalysts (Fluid Catalytic Cracking), mesostructured catalysts (such as MCM-41 etc.), and nanocrystalline zeolites (such as n-HZSM-5). Mixtures of these catalysts like SAHA/ZSM-5, MCM-41/ZSM-5 are also known. Differences in the catalytic activity of these solids are related to their acidic properties, especially the strength and number of acidic sites. The acid strength of the solid is characterized by the presence of Lewis or Brønsted acid sites. In general, heterogeneous catalysts have been more popular due to the ease of their separation and recovery of the reaction.

In addition to heterogeneous catalysts, homogeneous catalysts such as Lewis acids, e.g. $AlCl_3$, fused metal tetrachloroaluminatos (M ($AlCl_4$) n), where the metal may be lithium, sodium, potassium, magnesium, calcium, or barium and n can be 1 or 2) are also effective in promoting pyrolytic degradation.

To increase the yield of liquid hydrocarbons having molecular weights useful for their conversion to more valuable end products obtained from thermally or catalytically pyrolyzed waste plastics, the free radicals in newly formed volatilized or liquefied products need to be stabilized. If not stabilized, these hydrocarbon free radicals will combine with each other to produce undesirable heavy molecules such as heavy viscous tars having high boiling points. These hydrocarbon free radicals will also combine with carbon sites, to form more char.

A technique that has been used to upgrade tar liquids and improve middle distillate tar liquid yield in coal liquefaction, is the addition of gaseous hydrogen directly to the pyrolysis reactor. By hydrogenating volatilized hydrocarbons directly in the pyrolysis reaction zone, sulfur and nitrogen are removed as hydrogen sulfide and ammonia. Hydrogenation directly in the pyrolysis zone also reduces the viscosity and lowers the average boiling point of the subsequently condensed volatilized hydrocarbons by terminating some hydrocarbon free radicals before they are allowed to polymerize to heavy tar liquids.

A carbonaceous material feed, hot heat supplying carbon-containing residue, and hydrogen gas may be reacted in a transport flash pyrolysis reactor. Pyrolysis and hydrogenation of the pyrolysis products occur simultaneously. The effectiveness of hydrogen gas in terminating hydrocarbon free radicals is directly related to the hydrogen partial pressure. The pyrolysis reactor is preferably operated at pressures slightly greater than ambient, although pressures up to about 10,000 psig may also be used. An increase in hydrogen partial pressure increases free radical termination. High pressures, however, increase both the capital and operational cost of pyrolysis.

To minimize the side reactions of polymerization during pyrolysis, pyrolysis vapors are rapid cooled and condensed by either direct or indirect heat exchange. But the rapid cooling is not providing required minimization of tar from polymerizing by free radical-recombination in the liquid state.

A process for the recovery of condensed stabilized hydrocarbons produced by flash pyrolysis of solid particulate carbonaceous feed materials, and a process for the terminating free radicals by quenching may be achieved with a "capping agent". In this process pyrolytic vapors are contacted with a quench fluid, which comprises at least one capping agent capable of stabilizing newly formed volatilized hydrocarbon free radicals contained in the gaseous mixture stream. Such free radicals are stabilized by the transfer of hydrogen from the capping agent to the free radicals thereby forming stabilized radicals and a hydrogen depleted capping agent. Capping agents include hydrogen donor solvents, hydrogen transferring or shuttling agents, and/or free radical trapping agents, mixtures thereof and the like. Hydrogen donor solvents are those solvents which can donate hydrogen to tar free radicals to prevent recombination or polymerization of tar liquids by free radical mechanisms in the vapor or liquid state. Examples of hydrogen donor solvents are hydroaromatic compounds, such as tetrahydronaphthalene, dihydronaphthalene, partially hydrogenated phenanthrenes, partially hydrogenated anthracenes. Also useful as hydrogen donor solvents are fully saturated aromatic compounds or alicyclics, such as decahydronaphthalene, perhydroanthracene, perhydrophenanthrene.

Hydrogen transferring or shuttling agents do not have donatable hydrogen but can accept hydrogen from other sources and transfer the hydrogen to the hydrocarbon free radicals. Examples of hydrogen transferring or shuttling agents are naphthalene, anthracene, creosote oil, and the like.

Capping agents can also be free radical trapping agents, such as thiols, phenols, amines, and the like which can act either as hydrogen donor solvents and/or as hydrogen transferring or shuttling agents.

In pyrolysis of carbonaceous materials such as coal, coal minerals are capable of catalyzing liquefaction and replenishing of the hydrogen donor solvents. Under coal liquefaction conditions the hydrogen donor solvent (e.g., tetralin) donates its hydrogen to coal-derived free radicals, and coal minerals drive hydrogenation of solvents, providing their recovery and desulfurization of coal sulfur compounds.

Running processes in the presence of free radical initiators, capping agents, chain transfer agents, solvents containing hydrogen donors gets pretty complex and expensive. Regeneration of hydrogen donors containing solvents is much more costly and less environmentally friendly than direct stabilization of free radicals containing liquid products of thermal cracking or pyrolysis.

The described method of stabilization may be used for the thermal cracking of mixed plastic waste. It is reported that up to 60% of mixed plastics waste stream is represented by polyolefins. Other additional polymerized polymers in the waste stream such as acrylics, styrenics, and vinyls may also be used for production of valuable liquid recycled products after stabilization with the described treatment. Wider types of polymers found in the mixed plastic waste and potentially benefiting from the described technology are polyesters, polyethers, polycarbonates, polyurethanes, polyamides, polyimides, cellulose based plastics, combinations and copolymers of the above.

Other natural or synthetic minerals of similar composition to coal-derived fine mineral matter may be used as well.

In embodiments, the instant technology may be also very applicable for pyrolysis of biomass, e.g. biochar production, as in contrary to plastic waste, biomass contains significant amounts of oxygen and should be sensitive to the described catalysis.

The coal derived fine mineral matter stabilizer and possibly a catalyst for hydrogenation, may be contacted with the liquid phase (condensed vapor phase) and then filtered out (vacuum, gravimetric, etc) or separated by other techniques (distillation, extraction, precipitation, etc).

The primary thermolysis reactor described herein may be of several design types, e.g. bubbling fluidized bed, stirred tank reactors, screw/auger reactors, and/or fixed bed reactors.

An additional area of potential application of the described catalytic minerals is in Advanced Oil Recovery Methods (AORM). A progressive decrease in oil recovery and increase in the costs of extracted oil require new methods for enhancing oil recovery. Among these methods are: gas injection technique; thermal injection, e.g. steam-assisted gravity drainage and AORM. These techniques, including AORM are currently inefficient, too costly and ecologically unfavorable when used for the recovery of high-viscous, heavy and ultra-heavy oil. The catalytic conversion of heavy oil and non-traditional hydrocarbon compounds directly in the oil fields (in-situ catalytic upgrading process) presents a very high interest. The coke formation and catalyst poisoning are continuing challenges, which could be addressed by hydrogenation or hydrogen donation. Basalt and clay matrices may be used as supports for iron/basalt, nickel/basalt and iron/clay catalysts (6% wt % of active component prepared by the precipitation from non-aqueous solutions of the corresponding nitrate followed by the calcining and activation at 773° K).

The instant disclosure solves the coking issues of in-situ oil recovery in an economical and ecologically feasible way without complex impregnation and can be used for the catalytic oxidation of heavy oils and their conversion into light oils due to the redox reactions enabled by the described catalytic mineral.

The instantly disclosed mineral catalyst provides stabilization of the free-radical intermediates formed during thermal or catalytic cracking of hydrocarbon feedstocks and upgrades the quality of the liquid products obtained from thermolysis or pyrolysis of solid plastic waste or biomass or from cracking, coking or visbreaking of petroleum feedstocks. In addition, for additional effectiveness, an approach of creating supported catalyst by impregnating the described fine mineral matter with other active metals, such as iron, manganese, copper are described.

In some embodiments, the supported catalyst can be designed based on one or more matrices. For example, the supported catalyst could be designed based on iron (Fe)/fine mineral matter matrix and/or manganese (Mn)/fine mineral matter matrix and/or copper (Cu)/fine mineral matter matrix applied in concentrations between about 0.5 and about 10%, as described further below.

Fine Mineral Matter Stabilizer

A stabilizer of some of the present embodiments is based on inorganic fine mineral matter, a natural ancient mineral mixture found in coal deposits and containing a plurality of metals, such as iron, copper, aluminum, and manganese. It also contains calcium, barium, magnesium, potassium, sodium which are believed to act as co-catalysts. A typical example of the composition is: 30,100 ppm of iron, 17,600 ppm of calcium, 5,190 ppm of magnesium, 2,980 ppm of potassium, 1,920 ppm of sulfur, 1,190 ppm of nitrogen, 253 ppm of manganese, 139 ppm of phosphorous, 93 ppm of zinc, 43 ppm of copper, and 2 ppm of molybdenum.

Bulk mineralogy analysis of the inorganic fine mineral matter may be performed with X-ray diffraction (e.g., XRD) and X-ray fluorescence (e.g., XRF). The bulk mineral analysis of a non-exclusive, exemplary embodiment of the bulk minerals of the is presented in the Table 1 below:

TABLE 1

Mineralogy analysis of fine mineral matter.

| Mineral* | Examples of Chemical formula | Weight ranges, % |
|---|---|---|
| Mica/Illite | (K, Na, Ca)(Al, Mg, Fe)$_2$ (Si, Al)$_4$O$_{10}$(OH, F)$_2$ | 5-45 |
| Kaolinite | Al$_2$SiO$_2$(OH)$_4$ | 3-35 |
| Chlorite | (Mg, Fe, Al)$_6$(Si, Al)$_4$O$_{10}$ (OH) | 3-20 |
| Smectite | M$_{0.33}$, H$_2$OAl$_{1.67}$(Fe$^{2+}$, Mg$^{2+}$)$_{0.33}$ Si$_4$O$_{10}$(OH)$_2$, where M is metal cation | 0-30 |
| Quartz | SiO$_2$ | 5-30 |
| Calcite | CaCO$_3$ | 0-5 |
| K-feldspar | KAlSi$_3$O$_8$ | 0-5 |
| Plagioclase feldspar | NaAlSi$_3$O$_8$—CaAl$_2$Si$_2$O$_8$ | 0-20 |
| Pyrite | FeS$_2$ | <5 |
| Clinoptilolite | (Na, K, Ca)$_{2-3}$ Al$_3$(Al, Si)$_2$Si$_{13}$O·12H$_2$O | 0-5 |
| Jarosite | KFe$^{3+}$$_3$ (SO$_4$)$_2$(OH)$_6$ | 0-10 |
| Magnetite | Fe$_3$O$_4$ | 0-10 |

Mineral Oxides such as $Al_2O_3$, BaO, CaO, $Fe_2O_3$, MgO, $P_2O_5$, $K_2O$, $Na_2O$, $TiO_2$, $MnO_2$ may be also present in the composition of the fine mineral matter.

The porous structure of the fine mineral matter is believed to be accommodating variety of cations ranging from $Ca^{2+}$, $Mg^{2+}$, $Na^+$, $K^+$, to $Fe^{2+}$, $Fe^{3+}$, $Cu^+$, $Cu^{2+}$, $Mn^{2+}$, $Mn^{3+}$ which are loosely held and are readily available to be exchanged for others and to participate in electron transfer reactions. Herein, the use of various metallic elements in an elemental form and in an ionic form are interchangeable That is, a listing of metal ionic species such as cations ranging from $Ca^{2+}$, $Mg^{2+}$, $Na^+$, $K^+$, to $Fe^{2+}$, $Fe^{3+}$, $Cu^+$, $Cu^{2+}$, $Mn^{2+}$, and $Mn^{3+}$ may be used interchangeably with Ca, Mg, Na, K, to Fe, Fe, Cu, Cu, Mn, and Mn.

Bonding in minerals listed in Table 1 could be of either ionic or covalent character, producing different arrangements, symmetries, electric charges and bonding characteristics. A ligand fields approach would be most applicable as it includes the ions or molecules surrounding the central atom or ion and the resulting strengths of ligand field would be a controlling factor. Charge transfer processes also occur in ligand field situations and can lead to a photochemical oxidation-reduction.

The fine mineral matter comprises at least one and, in some embodiments, at least two elements selected from the group consisting of Fe, Cu, Mn, Zn, and Al. These metals in the fine mineral matter have concentrations measured with ICP-AES method utilizing nitric acid, hydrochloric acid and hydrogen peroxide in a heated digester and are defined in the range shown in Table 2.

TABLE 2

Concentration range of the metals in the fine mineral matter.

| Metal | Concentrations Range in ppm |
|---|---|
| Fe | 14,000-45,000 |
| Cu | 10-300 |
| Mn | 100-1,500 |
| Zn | 20-300 |
| Al | 3,000-25,000 |

The fine mineral matter further comprises a promoter from the list of elements such as Ca, K, Na, Mg or combinations thereof, to promote the oxidative degradation of plastics. The promoter in the fine mineral matter has concentrations defined in the range shown in Table 3. Other alkaline/alkaline earth containing minerals with similar fractions of soluble cations can also be used as promoters for oxidative degradation.

TABLE 3

Concentration range of the promoter in the fine mineral matter.

| Promoter (Alkali/Alkali Earth Metal) | Concentrations Range in ppm |
|---|---|
| Ca | 1,000-18,000 |
| K | 600-4,000 |
| Mg | 20-8,000 |

TABLE 4

The other elements identified the fine mineral matter by ICP-AES

| Element | ICP-AES, ppm |
|---|---|
| Aluminum | 5,000-20,000 |
| Barium | 100-800 |
| Beryllium | 0.9-1.1 |
| Boron | 5-17 |
| Chloride | 23-304 |
| Chromium | 14-28 |
| Fluoride | 3-5.6 |
| Nickel | <11 |
| Phosphorus | 100-300 |
| Selenium | ND |
| Silicon | 400-800 |
| Silver | ND |
| Sodium | 300-1000 |
| Sulfur | 1,500-3,300 |
| Tin | ND |
| Vanadium | 13-16 |

In some embodiments, the concentration of the stabilizing fine mineral matter can be between about 0.5% and about 50%, between about 1% and about 25%, and between about 5% and about 10%.

The fine mineral matter may be separated by the froth flotation techniques, or similar, and has particle sizes ranging from about 0.5 to about 50 microns, or about 0.5 to about 20 microns. In some embodiments, finer fractions can be used, such as between about 1 and about 5 microns, or between about 0.5 and about 2 microns. In some embodiments, the surface area of the fine mineral matter particles can range approximately from about 5 $m^2/g$ to about 35 $m^2/g$.

The catalytic activity of the aforementioned fine mineral matter towards reduction of molecular weight and change of the composition of polymeric materials is disclosed. The same approach would be feasible to drive visbreaking reactions in oil beds for in-situ treatment of heavy hydrocarbons in oil industry.

The fine mineral matter may be a by-product of coal recovery and accumulates at the rate of 22 kt/month in the US. By repurposing this waste material, a "zero waste initiative" is supported.

In addition to the fine mineral matter derived from coal, it may be derived from other natural resources, such as volcanic basalt, glacial rock dust deposits, iron potassium silicate and other sea shore deposits.

The mineral matter may also be sourced from certain types of phyllosilicates (e.g., glauconite, biotite) and from certain types of clays (e.g. illite, chlorite). Mixtures of phyllosilicates and clays may be also created to match desired composition—contain desired transition metals, alkali/alkaline earth metals, and/or main group metals and their ratios. The size of the mineral particles may be controlled by the grinding, milling and other particle reducing techniques.

The mineral composition being used may be also obtained by mixing different mining tails and controlling the particle size and particle size distribution of the mixed particles. Examples include but not limited to sulfide, phosphate minerals, aluminum (bauxite tailings), and other similar sources.

In some embodiments, the fine mineral matter may be sourced by phytomining. For example, one or more plants can be grown to accumulate high concentrations of the metals discussed above, e.g., Fe, Cu, Mn, Zn, Al and alkali/alkali earth metals such as K, Ca, Mg. Once a sufficient concentration of the transition metals, alkali metals, alkaline earth metals, and/or main group metals are accumulated in the plant, the plant can be burned and ions of the metals may be extracted therefrom to accumulate a desired composition of the metals.

In some embodiments, the fine mineral matter could be based on other, non-naturally occurring sources. For example, the fine mineral matter can be synthesized or collected from a synthetic source. These synthetic alternatives can be used in addition to, or in lieu of, geologic minerals, such as the fine mineral matter from naturally occurring sources, so long as the synthetics have a given amount of one or more of (chemical elements), purity (no competing donor/acceptor electron transfer, no electron/hole centers), required bonding, ligand field strength, photo and thermo sensitivity and activation energy of transitions, required porosity and surface energy, required moisture of hydration.

In some embodiments, components of oil in the production wells can be combined with air injection and temperature elevation to enhance oil recovery.

FIG. 1 shows a schematic diagram of a thermal reactor 100 for the conversion of an organic feedstock into stabilized hydrocarbons. The thermal reactor 100 may also be known as reactor, a waste processor, a chemical processing vessel, and so on. The reactor 100 may be of any number of types and/or designs. The thermal reactor 100 may be a fixed reactor, a fluidized bed reactor, a screw reactor, stirred tank reactor, and so on. The reactor 100 may be sized according to the quantities of organic feedstock materials being processed. The reactor 100 may be provided with thermal controls to heat and/or cool the reactor 100 as necessary to optimize the formation of upgraded liquid and gas products. The reactor 100 may be provided with pressure controls to raise or lower the pressure in the reactor 100 as necessary to optimize the formation of upgraded liquid and gas products.

The operation of thermal reactor 100 (e.g., reactor 100) may controlled by an algorithm (e.g., computer program). The algorithm may control the temperature of the reactor and/or the pressure of the reactor. The algorithm may be programmed to raise or lower the temperature at specific rates, and may be programmed to hold a set temperature for a duration. The algorithm may be programmed for a particular set of parameters. For example, algorithm may be programmed for raising the temperature of the reactor 100 at a first rate to a first set point temperature, then holding the temperature at the first set point for a first duration of time; and then changing the temperature to a second set point, and then holding it at the second set point for a second duration of time; and so on.

The algorithm may also be programmed for controlling a pressure of the reactor 100. For example, algorithm may be programmed for raising the pressure of the reactor 100 at a first rate to a first set point pressure, then holding the pressure at the first set point for a first duration of time; and then changing the pressure to a second set point, and then holding it at the second set point for a second duration of time; and so on.

The thermal reactor 100 includes a reactor vessel 110 with a reactor bed 115. Reactor bed material 120 is provided to the reactor bed 115. The reactor bed material 120 includes at least a first portion and a second portion. The first portion of the reactor bed material 120 includes a fine mineral matter. As described above, the fine mineral matter may be derived from a natural source, or may be prepared from non-naturally occurring sources.

The first portion of the reactor bed material 120 includes a fine mineral matter. In embodiments, the fine mineral matter has a porous structure and comprises a plurality of metals, such as iron, copper, manganese, aluminum, and zinc. It also may contain calcium, barium, magnesium, potassium, and/or sodium which are believed to act as co-catalysts. The aforementioned fine mineral matter has catalytic activity towards the reduction of molecular weight and change of the composition of polymeric materials. In embodiments, the fine mineral matter has a range of particle sizes between about 50 microns and 1 microns.

In embodiments, the fine mineral matter comprises at least one metal (and/or metal ions) selected from the group consisting of Fe, Cu, Mn, Zn, Al, or combinations thereof at the following concentrations: Fe 14,000 to 45,000 ppm; Cu 10 to 30 ppm; Mn 100 to 1,500 ppm; Al 3,000 to 25,000; and Zn 20 to 30 ppm. The metals may be in an elemental state, or may be in an oxidized state, such that the metals are present in an ionic form, or they may occur in a metal oxide, such as FeOx, CuOx, MnOx, ZnOx, AlOx, or any combination thereof. The metals may be in any oxidation state.

Furthermore, in embodiments, the fine mineral matter comprises at least one of Ca, K, Na, Mg, or combinations thereof at the following concentrations: Ca 1,000 to 18,000 ppm; K 600 to 4,000 ppm; Na 300 to 1,500 ppm; and Mg 20 to 8,000 ppm. The alkali (Na and K) and alkaline earth metal (Ca and Mg) elements may be in elemental state, or may be in an oxidized state, such that the metals are present in an ionic form, or they may occur in a metal oxide, such as $KO_x$, $NaO_x$, $MgO_x$, $CaO_x$, or any combination thereof. The alkali (Na and K) and alkaline (Ca and Mg) may be in any oxidation state.

In embodiments, the fine mineral matter may be derived from natural resources, such as coal, volcanic basalt, glacial rock dust deposits, iron potassium silicate, or sea shore deposits. The fine mineral matter may be one of the aforementioned natural resources, or may include one or more of the coal, volcanic basalt, glacial rock dust deposits, iron potassium silicate, or sea shore deposits.

In embodiments, the fine mineral matter is derived from non-naturally occurring sources. For example, the fine mineral matter may be synthesized or collected from a synthetic source. These synthetic alternatives may be used in addition to, or in lieu of, geologic minerals, such as the fine mineral matter from naturally occurring sources, so long as the synthetic fine mineral matter materials have a given amount of one or more of (chemical elements and/or ions), purity (no competing donor/acceptor electron transfer, no electron/hole centers), required bonding, ligand field strength, photo and thermo sensitivity and activation energy of transitions, required porosity and surface energy, required moisture of hydration.

Furthermore, the fine mineral matter may be in the form of a supported catalyst. The supported catalyst may include an iron (Fe)/fine mineral matter matrix, a manganese (Mn)/fine mineral matter matrix, a copper (Cu)/fine mineral matter matrix, or a combination thereof. The supported catalyst may be impregnated with an iron (Fe)/fine mineral matter matrix, a manganese (Mn)/fine mineral matter matrix, a copper (Cu)/fine mineral matter matrix, or a combination thereof Returning to FIG. 1, the reactor bed material 120 also may include at least a second portion. In embodiments, the second portion of the reactor bed material 120 may include silica sand, calcite, olivine, or other material. The second portion may also be a mixture of one or more of the aforementioned materials.

In embodiments, the first portion (e.g., fine mineral matter) may be mixed with the second portion in a concentration of between 0.5 and 50%. That is, the fine mineral matter may comprise between 0.5 and 50% of the total amount of reactor bed material 120. Regarding the support catalyst, the supported catalyst may be applied in concentrations between 0.5 and 10%.

Returning to FIG. 1, an organic feedstock 140 may be provided to the reactor bed 115 through an organic feedstock inlet 145. The organic feedstock 140 may include any one or more of many forms of organic materials. For example, in embodiments, the organic feedstock may be any one of a plastic solid waste, mixed solid plastic waste, biomass, organic solid waste, heavy oil feedstock, or in-situ heavy oil. The organic feedstock may also be a mixture of any of the aforementioned materials.

Furthermore, the organic feedstock may be hydrocarbon feedstocks and/or petroleum feedstocks.

The organic feedstock 140 may mix with the reactor bed material 120. The mixing may occur through a mechanical process, such as a screw, a stir mechanism, a pulverizer, and so on. The organic feedstock 140 may mix with the reactor bed material 120 may also be mixed by flow of a gas, such as a fluidizing gas 125.

A fluidizing gas 125 may be introduced into the reactor vessel 110 through a fluidizing gas inlet 130. The fluidizing gas may flow through a distributor 135 into the reactor bed 115 containing the reactor bed material 120 and the organic feedstock 140. The rate of flow of the fluidizing gas 125 may be adjusted to thoroughly mix the organic feedstock 140 may mix with the reactor bed material 120.

Heat 150 may be added to the reactor vessel 110 so that a predetermined reaction temperature is maintained. As described above, the heat may be provided according to an predetermined algorithm.

One or more reactor vessel 110 pressures may be provided in the reactor vessel 110. The pressure may be controlled by varying the pressure of the fluidizing gas, or varying the temperature of the reaction vessel 100, or by a combination of both. As described above, the pressure may be provided according to a predetermined algorithm.

The fluidizing gas may contain oxygen (e.g., $O_2$). In that case when the fluidizing gas includes oxygen, the conversion of the organic feedstock 140 to upgraded liquid and gas products is known as thermolysis.

The fluidizing gas may not contain oxygen (e.g., $O_2$). In that case, when the fluidizing gas does not include oxygen, the conversion of the organic feedstock 140 to upgraded liquid and gas products is known as pyrolysis. During pyrolysis, the fluidizing gas 125 may be largely nitrogen (e.g., $N_2$), although other inert gasses may be used, such as argon.

Returning to FIG. 1, upgraded liquid and gas products 160 are produced in thermal reactor 100. In embodiments, the fine mineral matter in the reactor bed material 120 catalyzes thermochemical recycling (e.g., chemical recycling), which entails theoretically unlimited recycling of any plastic material (mixed or sorted), where the focus is on recovering the building blocks of the plastic materials. The molecular weight is reduced, and the composition of the polymers in the organic feedstock 140 is changed in the reactions that take place in the thermal reactor 100. The fine mineral matter has catalytic activity towards the reduction of molecular weight and change of the composition of polymeric materials. The upgraded liquid and gas products 160 may be collected from the thermal reactor 100 through an upgraded liquid and gas products outlet 165.

Furthermore, in addition to producing upgraded liquid and gas products 160 in the thermal reactor 100, the process also produces solid waste 170 that may be removed from the thermal reactor 100 through a solid waste outlet 175. The solid waste may include tars, char, and other high viscosity materials.

Furthermore, in embodiments, the fine mineral matter drives visbreaking reactions in oil production wells for in-situ treatment of heavy hydrocarbons in oil industry. In this example, an oil well or tar sand development may function as a thermal reactor 100. In embodiments, fine mineral matter may be contacted with components of oil in an oil production well. Air may be injected into the well, and the contents may be heated to facilitate the cracking of highly viscus oil components into less viscus fluids that may be removed with a reduction in energy use and increase in efficiency, relative to removal of the highly viscus oil. This process is an improvement on Advanced Oil Recovery Methods (AORM), described above.

Figure 2:
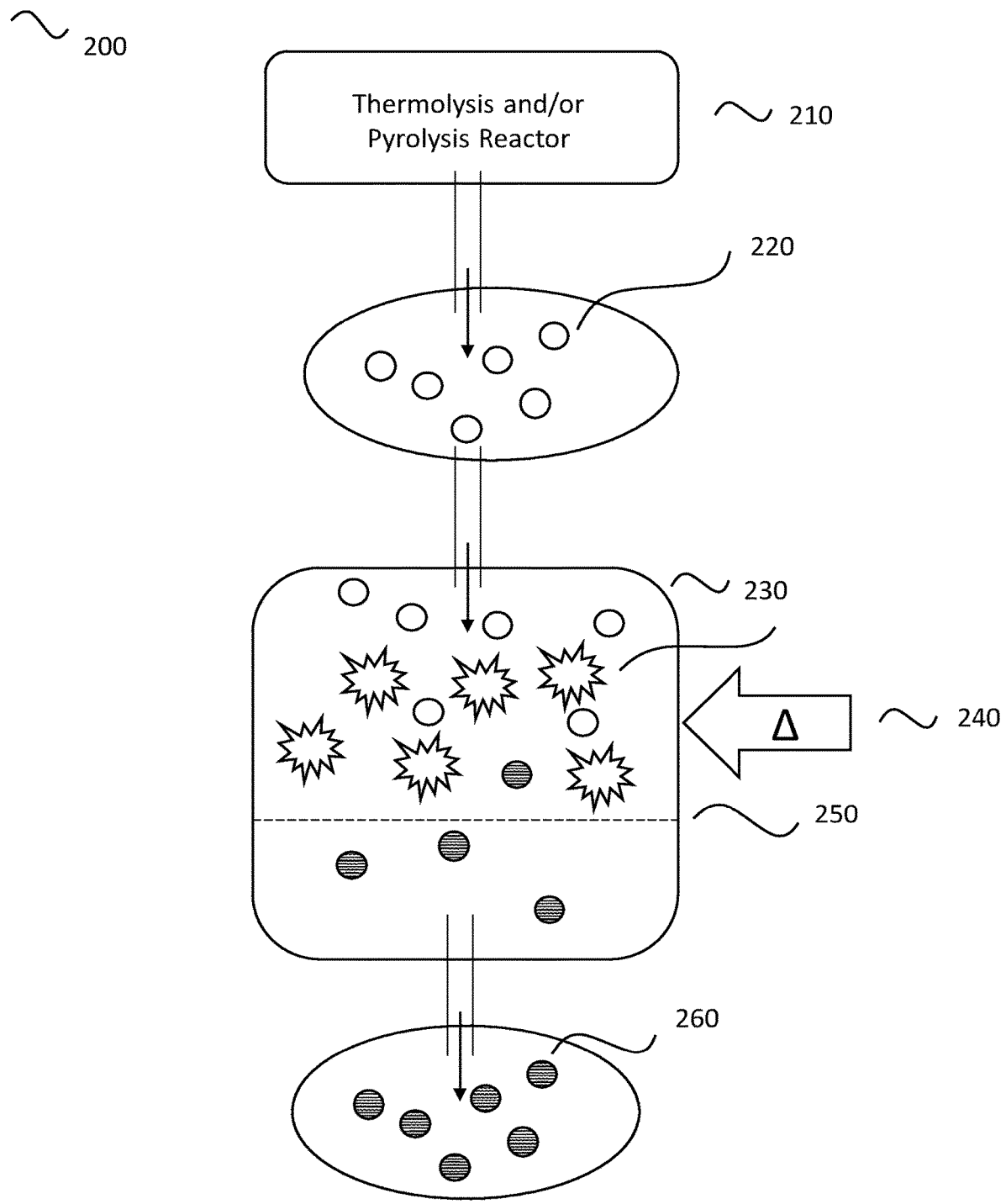

FIG. 2 schematically illustrates 200 stabilizing unstable quenched liquids, condensed gasses, and/or pyrolysis vapors. A reactor 210 produces a collection of unstable reaction products 220 that may include unstable quenched liquids, unstable condensed gasses, and/or unstable pyrolysis vapors. The unstable reaction products 220 are provided into a volume 230 that contains reactor bed material 240. The reactor bed material 240 comprises fine mineral matter and at least one of silica sand, calcite, olivine, or other material.

The unstable reaction products 220 interact with the reactor bed material 240, and the unstable reaction products 240 become stabilized (e.g., quenched) hydrocarbon products 260 through catalytic interactions with the fine mineral matter in the reactor bed materials 240. Heat 240 may be added to the volume 230. The stabilized hydrocarbon products 260 may be separated from the reactor bed material 240 by a filter 250, and are collected.

Figure 3:
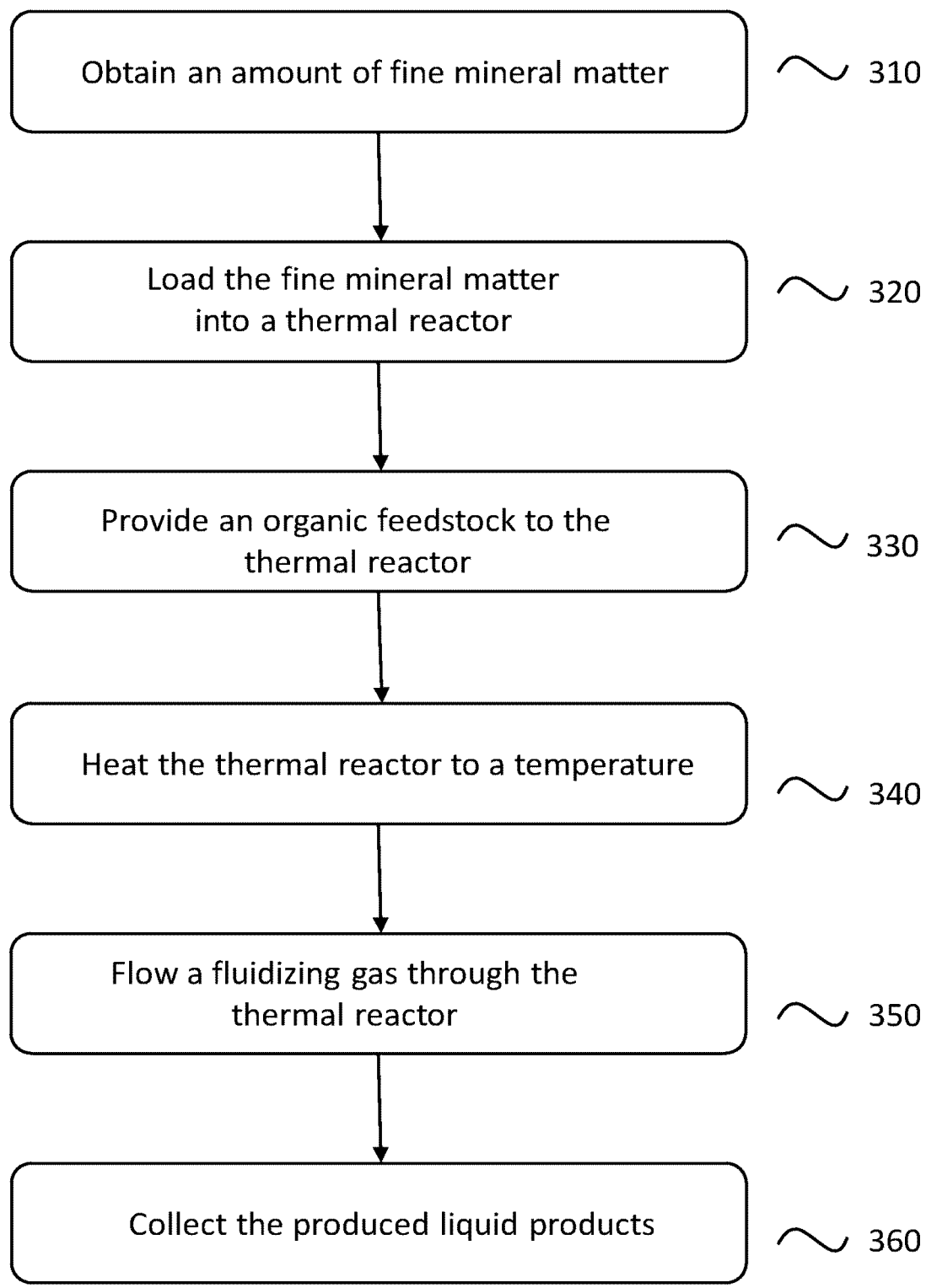
FIG. 3 illustrates an embodiment of a method of producing liquid and gas products from an organic feedstock.

FIG. 3 illustrates an embodiment of a method of producing liquid and gas products from an organic feedstock. In 310, an amount of a fine mineral matter is obtained. The fine mineral matter includes at least one metal selected from the group consisting of Fe, Cu, Mn, Al, Zn, or combinations thereof at the following concentrations: Fe 14,000 to 45,000 ppm; Cu 10 to 3000 ppm; Mn 100 to 1,500 ppm; Al 3,000 to 25,000; and Zn 20 to 300 ppm. The fine mineral matter may also include at least one of Ca, K, Na, Mg, or combinations thereof at the following concentrations: Ca 1,000 to 12,600 ppm; K 600 to 104,000 ppm; Na 300 to 11,000 ppm; and Mg 20 to 10,000 ppm. The fine mineral matter may have a range of particle sizes between about 50 microns and 1 micron.

The fine mineral matter may be derived from natural resources. The fine mineral matter may be derived from at least one of coal, volcanic basalt, glacial rock dust deposits, iron potassium silicate, or sea shore deposits, as described above.

The fine mineral matter may be derived from a synthetic source. Furthermore, the fine mineral matter may include a supported catalyst. The supported catalyst may include, and/or be impregnated with an iron (Fe)/fine mineral matter matrix, a manganese (Mn)/fine mineral matter matrix, a copper (Cu)/fine mineral matter matrix, or a combination thereof. The supported catalyst may be applied in concentrations between 0.5 and 10%.

In 320, the amount of fine mineral matter is loaded into the thermal reactor. The thermal reactor may be a fixed reactor, a fluidized bed reactor, a screw reactor, or stirred tank reactor. The thermal reactor may vary in size depending on the volume of organic feedstock to be processed, as well as the chemical and structural nature of the organic feedstock.

The fine mineral matter may be loaded in a reactor bed in the thermal reactor as a first portion of reactor bed material. In addition, the method may further include loading an amount of an additional reactor bed material into the thermal reactor. The additional reactor bed material may form a second portion of the reactor bed material, including at least one of silica sand, calcite, olivine, or other material. The reactor bed material may be mixed and/or stirred to uniformly spread the fine mineral matter within the second portion of the reactor bed material. In embodiments, the fine mineral matter may not be uniformly spread, but my be segregated into one portion that is adjacent to, or separate from the second portion of the reactor bed material. The concentration of the fine mineral matter in the reactor bed material is between 0.5 and 50%.

In 330, an organic feedstock is provided to the thermal reactor containing the fine mineral matter. The organic feedstock may include at least one of a plastic solid waste, mixed plastic solid waste, biomass, organic solid waste, heavy oil feedstock, or in-situ heavy oil.

In 340, the thermal reactor is heated to a temperature. In embodiments, heat is added to the thermal reactor. The heat may be added from a furnace, a heating blanket, a direct flame, and/or heat from a chemical reaction that is outside of the thermal reactor, or is inside the thermal reactor. That is, heat from combustion may comprise some or all of the heat provided to the thermal reactor. For example, in embodiments, the organic feedstock material may be ignited and may burn at high temperatures.

In 350, a fluidizing gas is flowed through the reactor. The fluidizing gas may contain oxygen (e.g., $O_2$), and, in this case, the conversion of the organic feedstock to upgraded liquid and gas products is known as thermolysis.

The fluidizing gas may not contain oxygen (e.g., $O_2$), and, in this case, the conversion of the organic feedstock to upgraded liquid and gas products is known as pyrolysis. During pyrolysis, the fluidizing gas may be largely nitrogen (e.g., $N_2$), although other inert gasses may be used, such as argon.

In 360, the produced liquid and gas products are collected from the thermal reactor. The produced liquid and gas products may comprise stabilized hydrocarbons. The stabilized hydrocarbons may comprise a gasoline (C4-C12), a kerosene (C10-C18), a diesel (C12-C23), a motor oil (C23-C40), or a combination thereof.

Figure 4:
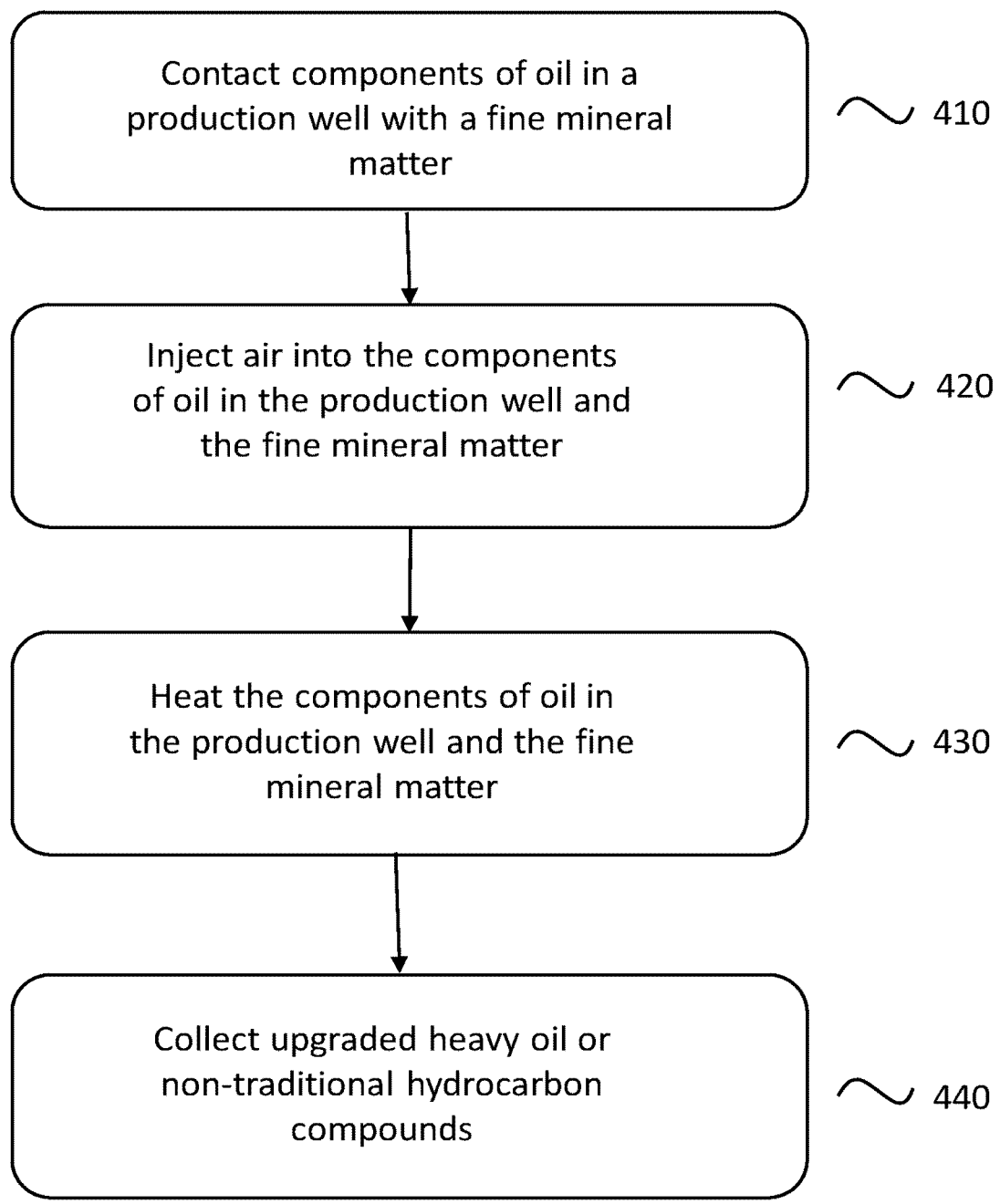
FIG. 4 illustrates an embodiment of a method of in-situ catalytic upgrading of heavy oil or non-traditional hydrocarbon compounds directly in the oil fields.

FIG. 4 illustrates an embodiment of a method of in-situ catalytic upgrading of heavy oil or non-traditional hydrocarbon compounds directly in the oil fields. The components of oil production may include an oil well or tar sand development where the oil components are highly viscous. In embodiments, fine mineral matter may be contacted with components of oil in an oil production well.

In 410, the components of oil in a production well are contacted with a fine mineral matter. The fine mineral matter may be derived from natural resources, such as coal and/or mined from natural resources including volcanic basalt, glacial rock dust deposits, iron potassium silicate and/or sea shore deposits with particle sizes ranging from between about 50 microns to about 1 micron. The fine mineral matter includes at least one metal selected from the group consisting of Fe, Cu, Mn, Al, Zn, or combinations thereof at the following concentrations: Fe 14,000 to 45,000 ppm; Cu 10 to 3000 ppm; Mn 100 to 1,500 ppm; Al 3,000 to 25,000; and Zn 20 to 300 ppm. The fine mineral matter may also include at least one of Ca, K, Na, Mg, or combinations thereof at the following concentrations: Ca 1,000 to 12,600 ppm; K 600 to 104,000 ppm; Na 300 to 11,000 ppm; and Mg 20 to 10,000 ppm. The fine mineral matter may have a range of particle sizes between about 50 microns and 1 microns.

The fine mineral matter may be derived from a synthetic source. Furthermore, the fine mineral matter may include a supported catalyst. The supported catalyst may include, and/or be impregnated with an iron (Fe)/fine mineral matter matrix, a manganese (Mn)/fine mineral matter matrix, a copper (Cu)/fine mineral matter matrix, or a combination thereof. The supported catalyst may be applied in concentrations between 0.5 and 10%.

In 420, air is injected into the components of oil in the production well and the fine mineral matter. Air and/or other gases may be injected into the well at ambient temperatures, or at elevated temperatures. In fact, the air (and/or other gases) may be heated to hundreds of degrees Celsius. Furthermore, the air may be added to the production well at atmospheric, or higher pressures.

In 430, the components of oil in the production well and the fine mineral matter are heated. The contents may be heated to facilitate the cracking of highly viscus oil components into less viscus fluids. The heating of the components of oil together with the fine mineral matter catalyzes the breaking of C—C bonds and the consequent reduction in viscosity of the components of oil.

In 440, the upgraded heavy oil or non-traditional hydrocarbon compounds are collected. The use of the fine mineral matter as described catalyzes the conversion of heavy oil and tar sands into upgraded heavy oil and non-traditional hydrocarbon compounds. Once formed, the upgraded heavy oil and non-traditional hydrocarbon compounds may be removed. The removal of the upgraded heavy oil and non-traditional hydrocarbon compounds may be accomplished with a reduction in energy use and increase in efficiency, relative to removal of the highly viscus oil without the use of the fine mineral matter. Furthermore, the instant process is an improvement on Advanced Oil Recovery Methods (AORM), described above.

Figure 5:
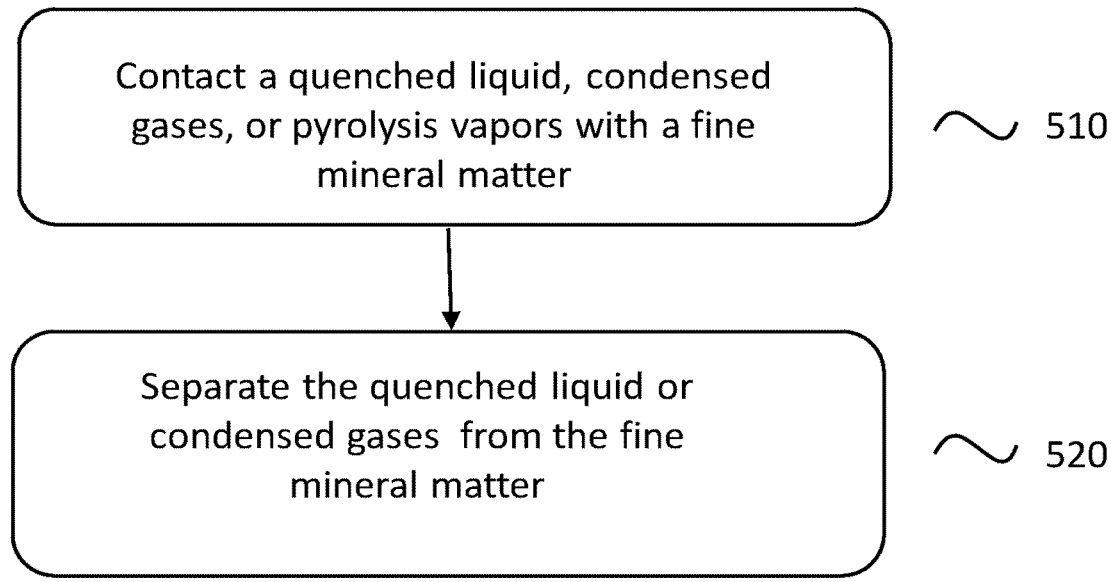
FIG. 5 illustrates an embodiment of a method of upgrading liquid products obtained by thermolysis or pyrolysis of solid plastic waste.

FIG. 5 illustrates an embodiment of a method of upgrading liquid products obtained by thermolysis or pyrolysis of solid plastic waste.

In 510, a quenched liquid, condensed gases, or pyrolysis vapors are contacted with a fine mineral matter. The quenched liquid, condensed gases, or pyrolysis vapors may be produced in a thermal reactor, such as a thermolysis or pyrolysis reactor. The quenched liquid, condensed gases, or pyrolysis vapors may be in an elevated energy state and still highly reactive with very reactive free radicals which further drive other reactions, including those leading to the char formation or formation of high viscosity liquids. The fine mineral matter may stabilize and possibly catalyze a process of hydrogenation, when contacted with the liquid phase (condensed vapor phase).

The fine mineral matter may be derived from natural resources, such as coal and/or mined from natural resources including volcanic basalt, glacial rock dust deposits, iron potassium silicate and/or sea shore deposits with particle sizes ranging from between about 50 microns to about 1 micron. The fine mineral matter includes at least one metal selected from the group consisting of Fe, Cu, Mn, Al, Zn, or combinations thereof at the following concentrations: Fe 14,000 to 45,000 ppm; Cu 10 to 3000 ppm; Mn 100 to 1,500 ppm; Al 3,000 to 25,000; and Zn 20 to 300 ppm. The fine mineral matter may also include at least one of Ca, K, Na, Mg, or combinations thereof at the following concentrations: Ca 1,000 to 12,600 ppm; K 600 to 104,000 ppm; Na 300 to 11,000 ppm; and Mg 20 to 10,000 ppm. The fine mineral matter may have a range of particle sizes between about 50 microns and 1 microns.

The fine mineral matter may be derived from a synthetic source. Furthermore, the fine mineral matter may include a supported catalyst. The supported catalyst may include, and/or be impregnated with an iron (Fe)/fine mineral matter matrix, a manganese (Mn)/fine mineral matter matrix, a copper (Cu)/fine mineral matter matrix, or a combination thereof. The supported catalyst may be applied in concentrations between 0.5 and 10%.

In 520, the quenched liquid or the condensed gases are separated from the fine mineral matter. The fine mineral matter is filtered out by methods such as vacuum, gravimetric, and so on, or separated by other techniques, such as distillation, extraction, precipitation, and so on.

EXAMPLES

The following examples are intended to further illustrate the disclosure and its preferred embodiments.

Structure of an Illite Clay

Figure 6:
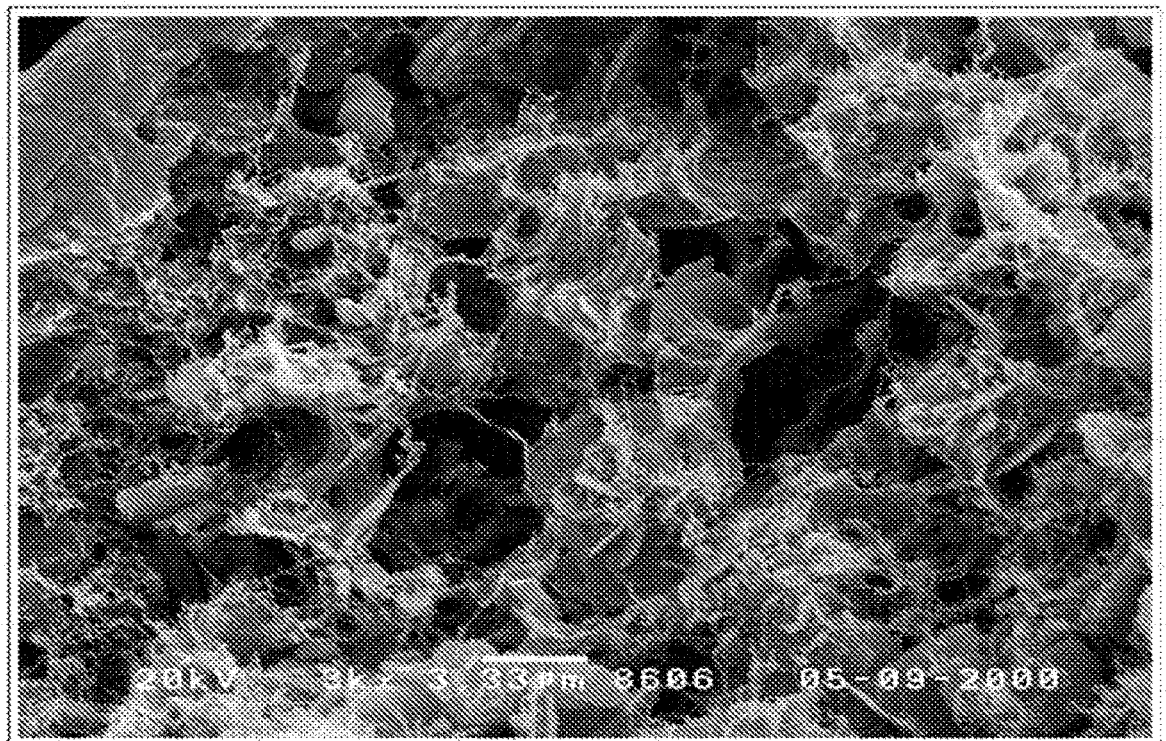
FIG. 6 shows scanning electron microscope image of the porous structure of the illite clay.

Some sedimentary clays making up the fine mineral matter have a porous structure and a water of hydration, similar to well-known zeolite minerals, which are well studied chemical catalysts. FIG. 6 shows a scanning electron microscope (SEM) image 610 of the porous structure of an illite clay.

Experimental Details

To minimize the side reactions of polymerization during pyrolysis, pyrolysis vapors are typically quenched and condensed by either direct or indirect heat exchange. But the rapid cooling is not providing required minimization of tar from polymerizing by free radical-recombination in the liquid state. That is, rapid cooling alone is not sufficient to stop the formation of tar by free radical recombination.

The purpose of these experiments is to demonstrate that the present embodiments of the fine mineral matter stabilize free radicals, and lead to upgrading the quality of the liquid products obtained from thermolysis or pyrolysis. Chemiluminescence (CL) technique was applied to the study of the reactivities of free-radical containing liquids.

Thermal degradation of most organic materials, including polymers, or organic waste, involves formation of very reactive free radicals which further drive other reactions, including those leading to the char formation or formation of high viscosity liquids. When such radicals recombine in an oxidizing environment, they produce weak light emission according to the Russell mechanism:

$$2R_1(R_2)CHO_2\square \rightarrow O_2^* + R_1(R_2)CHOH + R_1(R_2)C=O^*,\quad \text{Eq. 1}$$

where asterisks denote the singlet state of oxygen and triplet state of carbonyl groups in the polymer chain. The singlet state of oxygen and the triplet state of carbonyl groups in the polymer chain produce weak luminescence (i.e., a weak light signal.)

This weak light production, e.g., chemiluminescence (CL), is measured by luminometers. This technique of observing CL to the study mechanisms of polymer degradation, oxidation, stabilization, and kinetics has been known since early 1960s, and is applied here.

In these examples, two luminometers: a Lumipol-3, manufactured by MicroStep-MIS and a CLA manufactured by Tohoku, were used to measure the CL intensity over time as samples were kept at a constant temperature. The experimental apparatus includes a sample heating stage and a photo multiplier tube (PMT) in a light tight chamber. Lumipol-3 is capable of recording emitted light of intensity as low as 2 counts$^{s-1}$ at 40° C. Both instruments are very suitable for the measurement of a very weak light emission at the temperatures typical to those in thermolytic quenching.

Example 1

For these experiments, low density polyethylene (LDPE) compounds were made by melt compounding of mixed polyethylenes, specifically 50% LDPE and 50% LLDPE stabilized with 0.15% of phenolic antioxidant (compounds #1 and #2, Table 5). Compound #2 is identical to compound #1 and additionally contains the embodiments of the present coal-derived mineral at 0.75%. Compounding was done at the temperatures 127/127/121/127/121/121/131/137° C., from feeder to the die, in a 16 mm Thermo Fisher Prism twin screw extruder with L/d 25:1.

Figure 7:
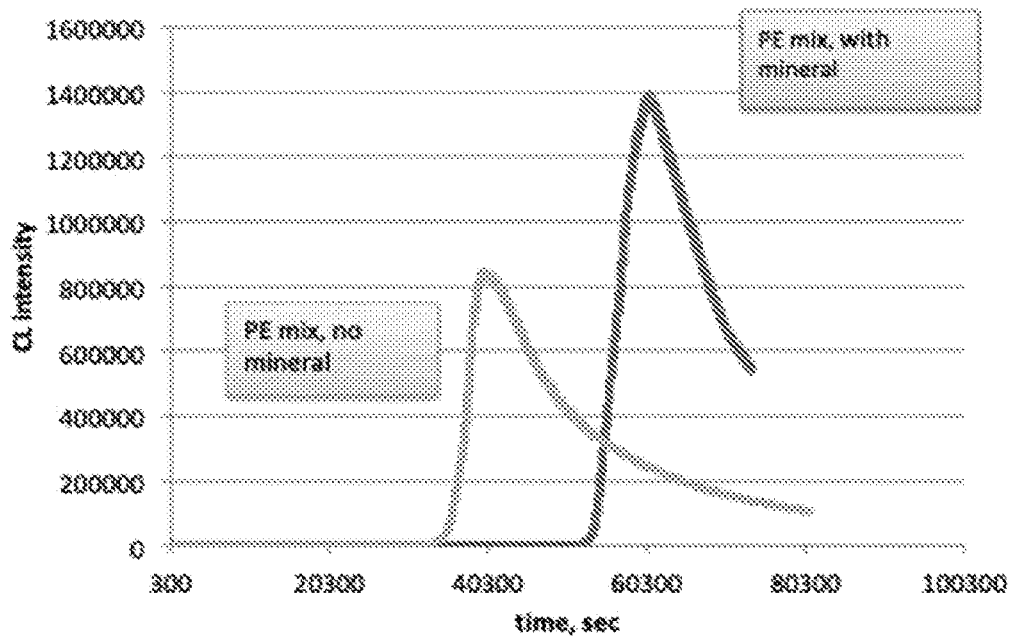
FIG. 7 shows a scan of chemiluminescence versus time for mixed pellets without mineral and with of a fine mineral matter additive.

FIG. 7 shows a plot of Lumipol-3 luminometer intensity versus time 710 for an isothermal scan of polyethylene (PE) mixed pellets without fine mineral matter mineral and with 0.75% of fine mineral matter (compounds #1 and #2), Lumipol-3. Compounded pellets and the 100 micron compression molded pressouts made from these pellets at 177° C. for 1 minute and 20,000 psi, were then ran in a Lumipol-3 luminometer isothermally in air at 190° C. The CL signal vs time followed an S-shaped curve with an initial "induction period", which is directly related to the formation of free radicals and stability of the material, as shown in FIG. 7. That is, the duration of the flat line prior to the rapid increase in CL intensity corresponds to an "induction period" that precedes the formation of free radicals. Once free radicals begin to form according to Eq. 1, the CL signal begins to increase. The CL signal peaks when the maximum number of luminescing species peaks, and then begins to fall as polymerization takes place and the free radical species are consumed.

As shown in FIG. 7, the stability of this compounded LDPE pellets can be greatly improved with the addition of the fine mineral matter. That is, the presence of the fine mineral matter increases the stability of the heated LDPE pellets (Compound #2) relative to the LDPE pellets without the fine mineral matter (Compound #1).

Example 2

In this experiment, the effect of the amount of fine mineral matter was investigated. LDPE based compounds were prepared with different amounts of the fine mineral matter. Compound #3 had 0.5%, and compound #4 had 3% of the same lot of the fine mineral matter. Both compounds additionally contained 0.2% of phenolic primary antioxidant.

Compounds #3 and #4 were compounded under the same conditions as Compounds #1 and #2, and the pressouts were made identically to the description in Example 1.

Figure 8:
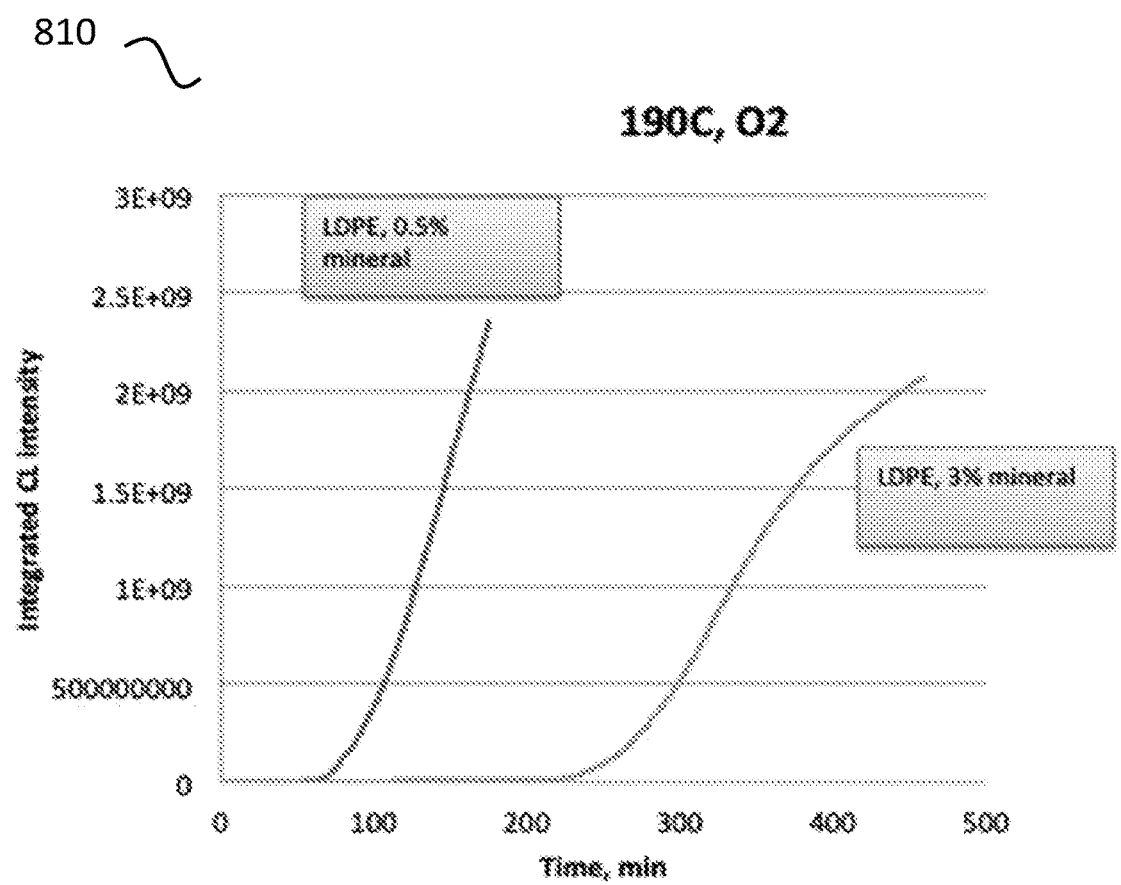
FIG. 8 shows a scan of chemiluminescence versus time for mixed pellets with two different amounts of a fine mineral matter additive.

A more severe oxidation was induced during the CLA Tohoku luminometer testing. Oxygen was flown through the cell at the rate of 50 ml/min, while the oxidation temperature was still kept at 190° C. FIG. 8 shows a plot of the total emitted light (integrated CL signal) 810. The pressout with 3% of the mineral (compound #4) had the induction period 3.6 times longer than the pressout containing 0.5% of the mineral (compound #3). The data is also added to Table 5.

TABLE 5

Summary of the CL data

| | Concentration of mineral, % | Temp. °C./Gas | Induction period, pellets, hrs | Time at max $I_{CL}$, pellets, hrs | Induction period, pressouts, hrs | Time at max $I_{CL}$, pressouts, hrs |
|---|---|---|---|---|---|---|
| Control compound #1 | 0 | 190/Air | 8.64 | 11.19 | 5.73 | 8.34 |
| Compound, mineral #2 | 0.75 | 190/Air | 14.15 | 16.67 | 10.54 | 13.67 |
| Compound, mineral #3 | 0.5 | 190/O$_2$, 50 ml/min | | | 0.9 | |
| Compound, mineral #4 | 3 | 190/O$_2$, 50 ml/min | | | 3.25 | |

Thus, from the data in Table 5, it can be seen that stability of all compounds has been greatly improved with the addition of the fine mineral matter. The stability of mixed LDPE/LLDPE pellets improved by almost 5.5 hrs in the presence of the mineral. Additional thermal history (demonstrated by sending the pellets through the compression molding at 177° C.) also produced a very similar result in mixed PE case.

For the LDPE pressouts, in the presence of 3% of the mineral, the induction time was increased to 3.25 hrs vs less than an hour in the presence of 0.5% of the mineral.

This data in Examples 1 and 2 demonstrates that the stability of liquids obtained after the quenching following thermolysis can be substantially improved and reactions of recombination and cross-linking leading to the products with increased viscosity can be prevented with the addition of the described stabilizing mineral.

The embodiments described above are intended to be merely exemplary; numerous variations and modifications will be apparent to those skilled in the art. Such variations and modifications are intended to be within the scope of the present disclosure as defined by any of the appended claims.

What is claimed is:

1. A method of producing liquid and gas products from an organic solid waste feedstock, the method comprising:
    obtaining an amount of a fine mineral matter, the fine mineral matter having a range of particle sizes between about 1 micron and about 2,000 microns and comprising at least one metal selected from the group consisting of Fe, Cu, Mn, Al, Zn, or combinations thereof;
    loading the amount of fine mineral matter into a thermal reactor, the fine mineral matter forming a portion of a reactor bed material;
    providing an organic solid waste solid waste feedstock to the thermal reactor containing the fine mineral matter;
    heating the thermal reactor to a temperature;
    flowing a fluidizing gas through the thermal reactor, the thermal reactor being held at the temperature and/or a pressure;
    converting the organic solid waste feedstock to produce liquid and gas products; and
    collecting the produced liquid and gas products from the thermal reactor.

2. The method of claim 1, wherein the produced liquid products comprise stabilized hydrocarbons containing a reduced amount of free radicals formed during said conversion relative to liquid products which would have been produced without the fine mineral matter.

3. The method of claim 2, wherein the stabilized hydrocarbons comprise a gasoline (C4-C12), a kerosene (C10-C18), a diesel (C12-C23), a motor oil (C23-C40), or a combination thereof.

4. The method of claim 1, wherein the fine mineral matter is derived from natural resources.

5. The method of claim 4, wherein the fine mineral matter is derived from at least one of coal, volcanic basalt, glacial rock dust deposits, iron potassium silicate, or sea shore deposits.

6. The method of claim 1, wherein the fine mineral matter is derived from a synthetic source or is impregnated with iron to form (Fe)/fine mineral matter matrix, manganese to form (Mn)/fine mineral matter matrix, and/or copper to form (Cu)/fine mineral matter matrix.

7. The method of claim 1, wherein fine mineral matter comprises at least one of Ca, K, Na, Mg, or combinations thereof at the following concentrations:
    Ca 1,000 to 2,600 ppm;
    K 600 to 10,000 ppm;
    Na 300 to 11,000 ppm; and
    Mg 20 to 10,000 ppm.

8. The method of claim 1, wherein:
    the portion of reactor bed material is a first portion; and
    the method further comprises:
        loading an amount of an additional reactor bed material into the thermal reactor, the additional reactor bed material forming a second portion of the reactor bed material.

9. The method of claim 8, wherein the second portion of the reactor bed material comprises at least one of silica sand, calcite, or olivine.

10. The method of claim 8, wherein the concentration of the fine mineral matter in the reactor bed material is between 0.5 and 50%.

11. The method of claim 1, wherein collecting the produced liquid and gas products comprises separating the produced liquid and gas products from solid products and the reactor bed material.

12. The method of claim 11, wherein the separating comprises at least one of a gravimetric separation or a distillation separation.

13. The method of claim 1, wherein the concentrations of the metals in the fine mineral matter are measured in ppm with ICP utilizing nitric acid, hydrochloric acid, and hydrogen peroxide in a heated digester.

14. The method of claim 1, wherein the fine mineral matter prevents or minimizes at least one of free radical polymerization, cross-linking, or recombination of hydrocarbon chains, thus reducing formation of high viscosity tar liquids, char, and other low value products.

15. The method of claim 1, wherein the organic solid waste feedstock comprises at least one of a plastic solid waste, mixed plastic solid waste, or biomass.

16. The method of claim 1, wherein the fine mineral matter comprises particles having a range of surface areas between about 5 $m^2/g$ and 35 $m^2/g$.

17. The method of claim 1, wherein the thermal reactor comprises a zeolite catalyst.

18. The method of claim 17, wherein the zeolite minerals comprise at least one of ZSM-5, Y, Beta, or n-HZSM-5.

19. A method of upgrading products obtained by thermolysis or pyrolysis of solid plastic waste, the method comprising:
   obtaining a quenched liquid, condensed gases, or pyrolysis vapors from thermolysis or pyrolysis of solid plastic waste;
   contacting the quenched liquid, condensed gases, or pyrolysis vapors with a fine mineral matter derived from coal and/or mined from natural resources including volcanic basalt, glacial rock dust deposits, iron potassium silicate and/or sea shore deposits with particle sizes ranging from about 1 micron to less than about 2,000 microns to about 1 micron, wherein the fine mineral comprises at least one metal selected from the group consisting of Fe, Cu, Mn, Al, Zn, or combinations thereof; and
   separating the quenched liquid, condensed gases, or pyrolysis vapors from the fine mineral matter.

20. A method of upgrading products obtained by thermolysis or pyrolysis of solid Plastic waste, the method comprising:
   obtaining a quenched liquid, condensed gases, or pyrolysis vapors from thermolysis or pyrolysis of solid plastic waste;
   contacting the quenched liquid, condensed gases, or pyrolysis vapors with a supported catalyst, the supported catalyst comprises an iron (Fe) on a fine mineral matter matrix, a manganese (Mn) on a fine mineral matter matrix, a copper (Cu) on a fine mineral matter matrix, or a combination thereof, the supported catalyst is applied in concentrations between 0.5 and 10%, wherein the fine mineral matter has a range of particle sizes between 1 micron and about 2,000 microns and comprises at least one metal selected from the group consisting of Fe, Cu, Mn, Al, Zn, or combinations thereof; and
   separating the quenched liquid, condensed gases, or pyrolysis vapors from the fine mineral matter.

* * * * *